United States Patent
Kuipers et al.

(10) Patent No.: US 9,912,376 B2
(45) Date of Patent: Mar. 6, 2018

(54) MANAGING CROSSTALK IN VECTORED TRANSMISSIONS

(71) Applicant: Adtran, Inc., Huntsville, AL (US)

(72) Inventors: Martin Kuipers, Dallgow-Döberitz (DE); Richard Lee Goodson, Huntsville, AL (US); Fred Tze-Yu Chu, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 146 days.

(21) Appl. No.: 14/798,547

(22) Filed: Jul. 14, 2015

(65) Prior Publication Data
US 2016/0020823 A1 Jan. 21, 2016

Related U.S. Application Data
(60) Provisional application No. 62/024,908, filed on Jul. 15, 2014.

(51) Int. Cl.
*H04B 3/32* (2006.01)
*H04J 3/10* (2006.01)
(Continued)

(52) U.S. Cl.
CPC ............ *H04B 3/32* (2013.01); *H04J 3/10* (2013.01); *H04L 5/14* (2013.01); *H04M 3/34* (2013.01);
(Continued)

(58) Field of Classification Search
CPC ... H04B 3/32; H04J 3/10; H04M 3/34; H04M 11/062; H04M 11/06; H04L 5/14
See application file for complete search history.

(56) References Cited

U.S. PATENT DOCUMENTS

| | | | |
|---|---|---|---|
| 2002/0058513 A1* | 5/2002 | Klein | H04W 16/02 455/447 |
| 2009/0271550 A1* | 10/2009 | Clausen | H04L 25/085 710/269 |

(Continued)

FOREIGN PATENT DOCUMENTS

| WO | 2010/002908 | 1/2010 |
|---|---|---|
| WO | 2014/059925 | 4/2014 |

OTHER PUBLICATIONS

International Search Report and Written Opinion in International Application No. PCT/US2015/040510 dated Sep. 16, 2015, 12 pages.

*Primary Examiner* — Lisa Hashem
(74) *Attorney, Agent, or Firm* — Fish & Richardson P.C.

(57) ABSTRACT

Methods, systems, and apparatus for crosstalk avoidance in a telecommunications network are disclosed. In one aspect a telecommunications device includes a transceiver and a vectoring engine coupled to the transceiver. The vectoring engine can include a vectoring processor and vectoring control entity (e.g., apparatus). The vectoring engine is configured to instruct the transceiver to transmit, over a given line pair of a given vectoring group, initialization symbols at one or more configurable locations of a Time-Division Duplex (TDD) frame. For example, the vectoring engine can instruct the transceiver to transmit the initialization symbols beginning at a first symbol time following transmission, over other line pairs of the given vectoring group, of a Robust Management Channel (RMC) symbol.

18 Claims, 6 Drawing Sheets

(51) Int. Cl.
*H04L 5/14* (2006.01)
*H04M 3/34* (2006.01)
*H04M 11/06* (2006.01)

(52) U.S. Cl.
CPC .......... *H04M 11/06* (2013.01); *H04M 11/062* (2013.01)

(56) References Cited

U.S. PATENT DOCUMENTS

| | | | | |
|---|---|---|---|---|
| 2013/0272177 A1* | 10/2013 | Wei | ............................ | H04L 5/14 370/294 |
| 2013/0279687 A1* | 10/2013 | Wei | ...................... | H04L 1/0002 379/350 |
| 2013/0294298 A1* | 11/2013 | Chang | ................. | H04L 27/2602 370/280 |
| 2014/0029406 A1* | 1/2014 | Liang | ........................ | H04J 3/10 370/201 |
| 2014/0161000 A1* | 6/2014 | Fazlollahi | ................ | H04B 3/32 370/280 |
| 2014/0254791 A1* | 9/2014 | Wei | ...................... | H04M 11/062 379/406.01 |
| 2014/0307749 A1* | 10/2014 | Liang | ................... | H04L 27/2601 370/509 |
| 2014/0334283 A1* | 11/2014 | Chang | ................... | H04M 3/304 370/201 |
| 2015/0055449 A1* | 2/2015 | Li | .......................... | H04L 1/0072 370/216 |
| 2015/0109970 A1* | 4/2015 | Sorbara | ................. | H04L 5/1469 370/278 |
| 2015/0124943 A1* | 5/2015 | Oksman | ................ | H04M 3/302 379/1.03 |
| 2015/0244418 A1* | 8/2015 | Verbin | ...................... | H04B 3/32 370/201 |
| 2015/0326305 A1* | 11/2015 | Chang | .................. | H04B 7/2656 370/280 |
| 2016/0119107 A1* | 4/2016 | Oksman | ................... | H04B 3/32 370/201 |
| 2016/0182122 A1* | 6/2016 | Nuzman | ................ | H04M 3/007 370/201 |
| 2016/0197646 A1* | 7/2016 | Lv | ............................ | H04B 3/32 370/201 |
| 2016/0212036 A1* | 7/2016 | Oksman | ................... | H04B 3/32 |
| 2017/0201398 A1* | 7/2017 | Rao | ....................... | H04L 27/0012 |
| 2017/0250731 A1* | 8/2017 | Medeiros | ................. | H04B 3/32 |

\* cited by examiner

MANAGING CROSSTALK IN VECTORED TRANSMISSIONS

CROSS-REFERENCE TO RELATED APPLICATIONS

This application claims the benefit under 35 U.S.C. § 119(e) of U.S. Patent Application No. 62/024,908, entitled "Methods and Systems for Alignment of Data Symbols Used During Initialization of G.fast DSL Communications in a Telecommunications Environment," filed Jul. 15, 2014, which is incorporated herein by reference in its entirety.

BACKGROUND

This specification relates to communications in a telecommunications environment.

Crosstalk can interfere with communications in a digital subscriber line (DSL) system. Crosstalk refers to the electromagnetic coupling between neighboring twisted pairs. Vectoring (also referred to as vectoring techniques or vectored transmission) is a technology for cancelling crosstalk in DSL systems. Crosstalk cancellation techniques implemented in vectoring systems are generally only effective for cancelling crosstalk between members of a same vectoring group ("intra-group crosstalk"). However, the twisted pair conductors outside of a given vectoring group (e.g., belonging to other vectoring groups) can introduce crosstalk between vectoring groups. In some instances, the crosstalk between vectoring groups is referred to as inter-group crosstalk. The existence of inter-group crosstalk can degrade the performance of a vectored system.

SUMMARY

In general, one innovative aspect of the subject matter described in this specification can be embodied in a telecommunications device that includes a transceiver; and a vectoring engine coupled to the transceiver. The vectoring engine can include a vectoring processor and vectoring control entity. The vectoring engine can be configured to instruct the transceiver to transmit, over a given line pair of a given vectoring group, initialization symbols at one or more configurable locations of a Time-Division Duplex (TDD) frame.

These and other embodiments can each optionally include one or more of the following features. The vectoring engine can be configured to instruct the transceiver to transmit the initialization symbols beginning at a first symbol time following transmission, over other line pairs of the given vectoring group, of a Robust Management Channel (RMC) symbol.

The vectoring engine can be configured to instruct the transceiver to transmit the initialization symbols at a beginning of a Discontinuous Operation Interval (DOI) for the given vectoring group that includes the given line pair. The vectoring engine can be configured to adjust a location of the beginning of the DOI for the given vectoring group that includes the given line pair. The vectoring engine can be configured to locate the beginning of the DOI at a first symbol time following transmission of a RMC symbol. The vectoring engine can be configured to instruct the transceiver to simultaneously transmit initialization symbols over multiple line pairs of the given vectoring group during the DOI for the given vectoring group.

The vectoring engine can be configured to instruct the transceiver to transmit a RMC symbol to multiple different vectoring groups. Tones used to transmit the RMC symbol to each vectoring group can be disjoint relative to tones used to transmit the RMC symbol to other vectoring groups.

The vectoring engine can be configured to prevent transmission of data over other vectoring groups while the initialization symbols are being transmitted over the given vectoring group.

Another innovative aspect of the subject matter described in this specification can be embodied in a system that includes multiple line pairs configured into multiple vectoring groups; and a vectoring engine that is connected to the multiple line pairs and controls transmission of symbols over the multiple line pairs and multiple vectoring groups, wherein the vectoring engine is configured to instruct a transceiver to transmit, over a single vectoring group, initialization symbols at one or more configurable locations of a TDD frame.

These and other embodiments can each optionally include one or more of the following features. The vectoring engine can be configured to instruct the transceiver to transmit the initialization symbols beginning at a first symbol time following transmission of a RMC symbol over other line pairs of the given vectoring group. The vectoring engine can be configured to instruct transceivers to transmit a RMC symbol to multiple different vectoring groups. Tones used to transmit the RMC symbol to each vectoring group can be disjoint relative to tones used to transmit the RMC symbol to other vectoring groups.

Another innovative aspect of the subject matter described in this specification can be embodied in methods that include the actions of identifying, by a telecommunications device, a customer premises equipment (CPE) that is connected to a given line pair; and transmitting, by the telecommunications device and over the given line pair, initialization symbols at a configurable location of a TDD frame following transmission of an RMC symbol.

These and other embodiments can each optionally include one or more of the following features. Transmitting the initialization symbols can include transmitting the initialization symbols beginning at a first symbol time following transmission of a RMC symbol over other line pairs.

Transmitting the initialization symbols can include transmitting the initialization symbols at a beginning of a DOI period for the given vectoring group that includes the given line pair.

Methods can include adjusting a location of the beginning of the DOI period for the given vectoring group that includes the given line pair.

Methods can include locating the beginning of the DOI period at a first symbol time following transmission of the RMC symbol.

Methods can include simultaneously transmitting initialization symbols over multiple line pairs of the given vectoring group during the DOI period for the given vectoring group.

Methods can include preventing, by the telecommunications device, transmission of data over other vectoring groups while the initialization symbols are being transmitted over the given vectoring group.

Particular embodiments of the subject matter described in this specification can be implemented so as to realize one or more of the following advantages. The example techniques can be used to avoid/eliminate inter-group crosstalk between vectoring groups. The example techniques also enable a Robust Management Channel ("RMC") symbol to be transmitted over all vectoring groups simultaneously while avoiding crosstalk between the vectoring groups. Initialization symbols can be simultaneously transmitted over one or more different vectoring lines of a given vectoring group without interfering with communications on other vectoring groups. Multiple vectoring groups can be used within a single wire binder when the number of line pairs exceeds the maximum vectoring group size of the system. The techniques described in this document improve telecommunications technologies, for example, by increasing the number of line pairs/customers that can be supported in a single wire binder.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
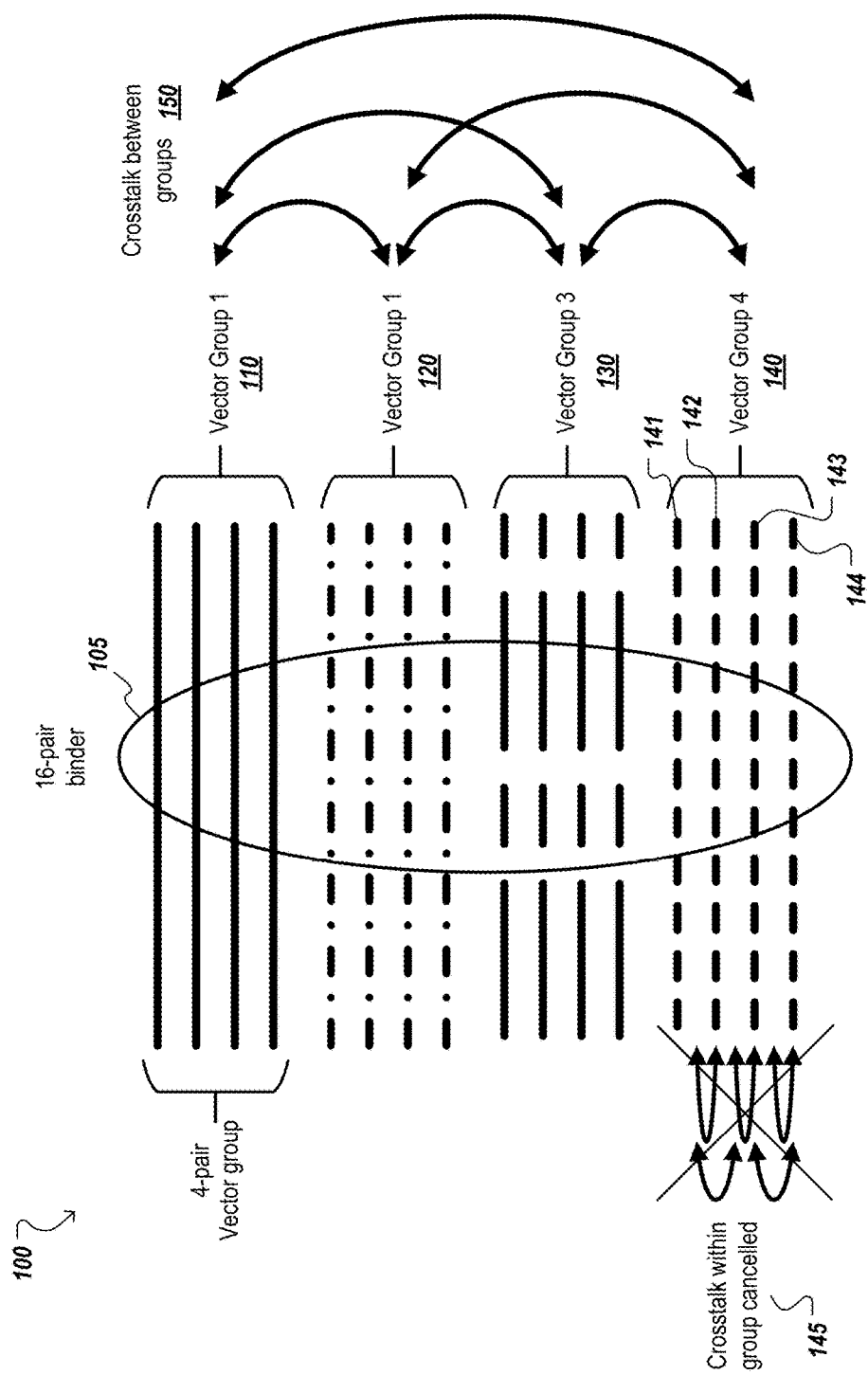
FIG. 1 shows example crosstalk effects when multiple vectoring groups are include in a wire binder.

This document describes example techniques for managing crosstalk in a digital subscriber line (DSL) system (e.g., a system that implements DSL technologies). The example techniques allow multiple vectoring groups to coexist in a single wire binder when the number of twisted pair conductors (can also referred to as "lines" or "links") contributing crosstalk into the system exceeds the maximum vectoring group size.

In some instances, a wire binder can include one or more twisted pair conductors over which two or more network elements can communicate in a telecommunications system. For instance, a wire binder can include multiple twisted pair conductors that are grouped into one or more vectoring groups. In some instances, the maximum number of twisted pair conductors that can be included in a particular vectoring group may be limited. For example, VDSL2 vectoring techniques can generally cancel crosstalk across hundreds of (e.g., 200) twisted pair conductors that are in a same vectoring group, while G.fast vectoring techniques may be limited to cancelling crosstalk across a much smaller number of (e.g., four to sixteen) twisted pair conductors in a same vectoring group. As such, there may be more than one vectoring group in a wire binder. The twisted pair conductors outside of a particular vectoring group (e.g., belonging to other vectoring groups) can introduce inter-group crosstalk between vectoring groups, which can negatively affect the system performance.

Some systems like G.fast provide means to optimize power consumption and the usage of vectoring resources. The TDD frame can be divided into a Normal Operation Interval ("NOI") and a Discontinuous Operation Interval ("DOI"). Generally, during NOI all lines of a system or vectoring group transmit. The management system can dynamically determine the parts of the DOI to be used by particular lines. This can save power by switching off transmitters that do not have enough data to transmit. Furthermore, the number of lines transmitting at the same time can be limited to save vectoring resources. In some implementations the DOI/NOI concept can be used to perform crosstalk management of different vectoring groups.

Example crosstalk management techniques can utilize two transmission modes (e.g., Discontinuous Operation Intervals ("DOI") during which only a single vectoring group transmits at and given time, and Normal Operation Intervals ("NOI") during which all vectoring groups transmit simultaneously). As discussed below, NOI can be used to simultaneously transmit Robust Management Channel ("RMC") information using transceivers of all the vectoring groups, and DOI can be used to transmit initialization symbols and other data (e.g., upstream and/or downstream symbols) using transceivers of the individual vectoring groups at different times. In some implementations, the initialization symbols are transmitted at a configurable location of a Time-Division Duplex ("TDD") frame so that transmission of the initialization symbols (which are transmitted over all available tones) does not interfere with RMC information being transmitted over other vectoring groups.

Throughout this document the terms downlink, downstream ("DS") and downstream communications are used to refer to communications transmitted toward the end user or subscriber, while the terms uplink, upstream ("US") and upstream communications are used to refer to communications transmitted toward the service provider (e.g., a telecommunications service provider's central office).

Figure 2:
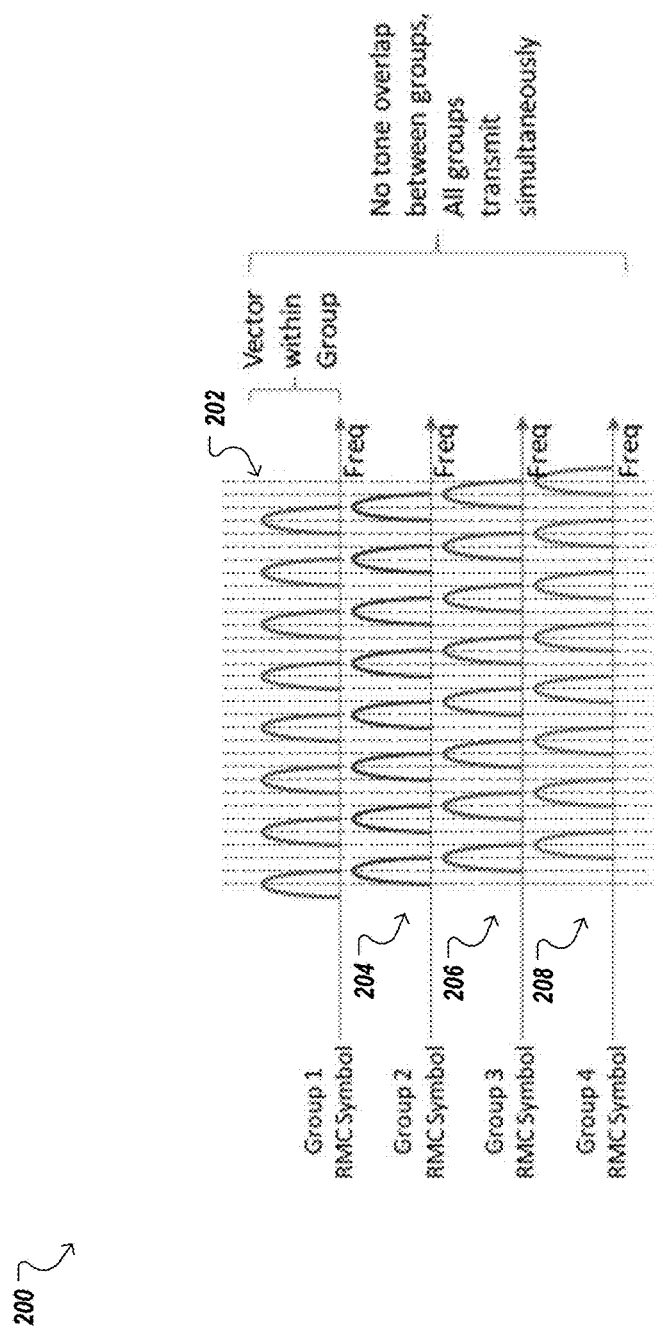
FIG. 2 is an illustration of an example tone allocation that can be used to simultaneously transmit RMC symbols over multiple different vectoring groups.
Figure 4:
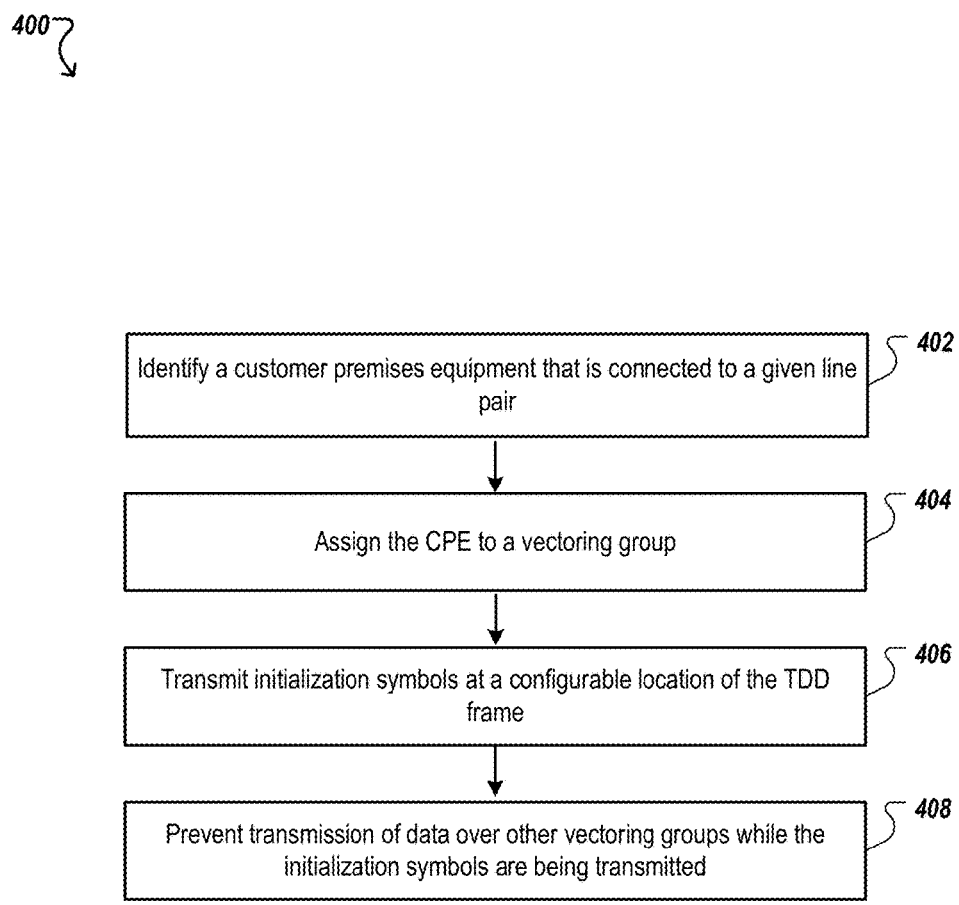
FIG. 4 is a flow chart of an example process for avoiding crosstalk in a vectored communications system.
Figure 5:
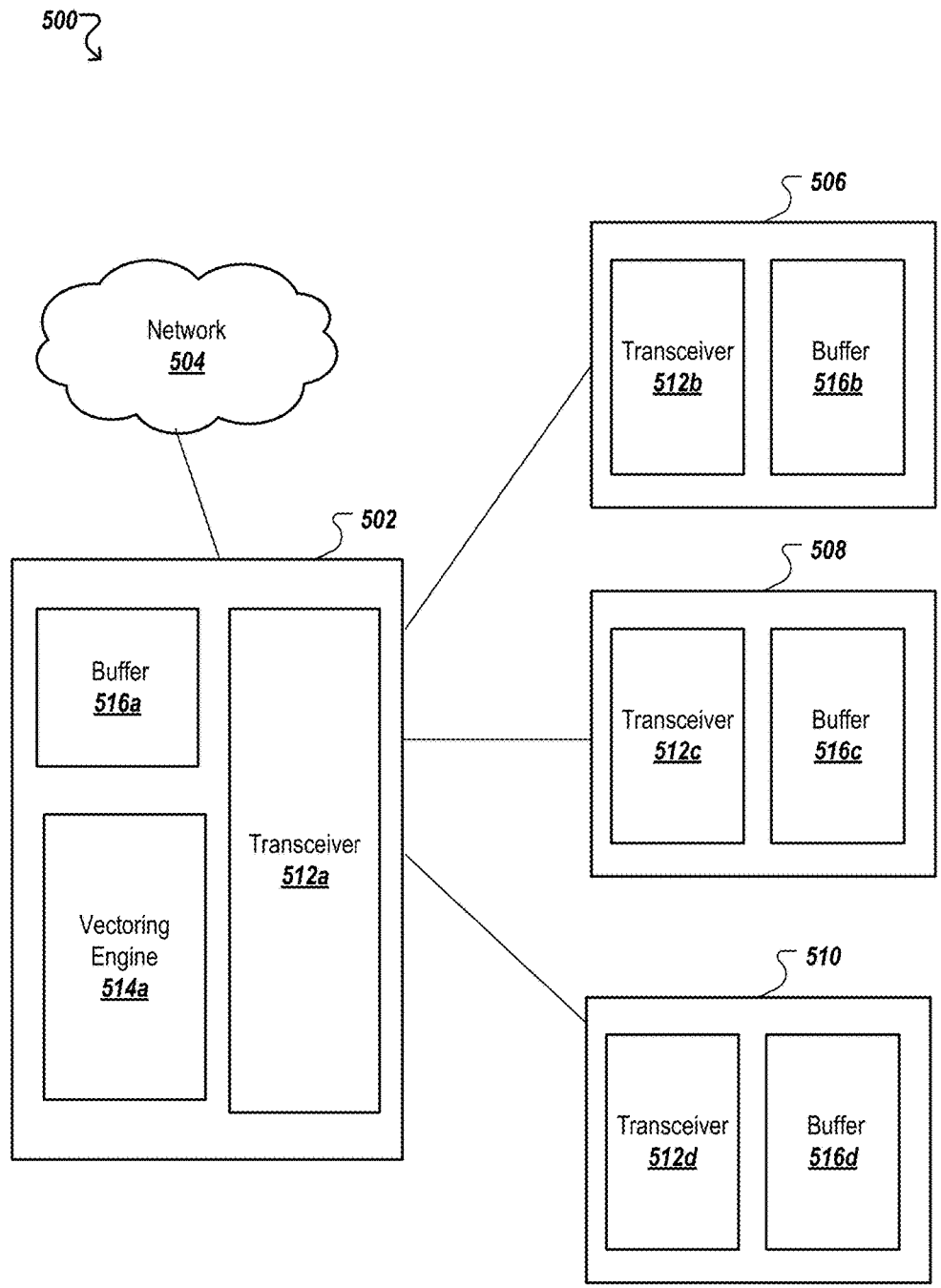
FIG. 5 is a block diagram of an example environment in which crosstalk avoidance techniques can be implemented.

FIG. 1 shows example crosstalk effects when multiple vectoring groups are include in a wire binder. While FIGS. 2-3B show specific examples of the crosstalk avoidance schemes and FIG. 4 shows an example method for avoiding and managing crosstalk when multiple vectoring groups are used for data transmission in a telecommunication system. Finally, FIG. 5 shows an example telecommunications environment (and telecommunications devices) in which the example crosstalk management techniques can be applied.

FIG. 1 is a diagram 100 showing example intra-group crosstalk within a vectoring group and inter-group crosstalk between vectoring groups when vectoring techniques are used in a communication environment. The communication environment may be a VDSL communications environment, a G.fast communications environment, or another communications environment. The vectoring techniques can include, for example, VDSL2 vectoring techniques, G.fast vectoring techniques, or other vectoring techniques.

In this example, the diagram 100 includes a wire binder 105 that includes wire pairs assigned to multiple vectoring groups. As illustrated, the wire binder 105 includes four vectoring groups 110, 120, 130, and 140. Each vectoring group includes four twisted pair conductors (also referred to as links) As such, the wire binder 105 is a 16-pair binder. In some implementations, the wire binder 105 can include a different number of vectoring groups, and each vectoring group can include a different number of links.

Within each vectoring group (e.g., the vectoring group 4), the crosstalk 145 between the links 141, 142, 143, and 144 within the vectoring group 4 can be cancelled, for example, by joint signal processing of all signals transmitted over the links 141, 142, 143, and 144. For instance, a vectoring apparatus (or engine) of a network element can process signals transmitted over the links 141, 141, 143, and 144 and thus cancel the intra-group crosstalk 145 within the vectoring group 4.

Among the multiple different vectoring groups 110, 120, 130, and 140, however, the inter-group crosstalk 150 between these vectoring groups will not be cancelled. The inter-group crosstalk 150 between the vectoring groups 110, 120, 130, and 140 can reduce the signal to noise ratio, limit data rates, and degrade the performance of the system.

Crosstalk avoidance techniques can be used to avoid/reduce the adverse effects of the inter-group crosstalk. For example, when DOI is used, only a single vectoring group will be transmitting at any given time, thereby eliminating any inter-group crosstalk. However, if DOI is used to transmit SYNC symbols and RMC symbols, multiple different symbol times will be required to send the SYNC and RMC symbols over the various vectoring group, which will reduce the capacity remaining to carry downstream and upstream data. In some implementations or for a particular transmission direction, it may not be possible to change the position of the SYNC and/or RMC symbol in a TDD frame. To limit the number of symbol times used to transmit the SYNC and RMC symbols, one crosstalk avoidance technique includes transmitting RMC symbols simultaneously over all vectoring groups and/or lines that are in showtime (i.e., post initialization data transmission), but using a different set of non-overlapping tones for each vectoring group so as to prevent inter-group crosstalk between the vectoring groups.

FIG. 2 is an illustration 200 of an example tone allocation that can be used to simultaneously transmit RMC symbols over multiple different vectoring groups, while avoiding inter-group crosstalk. As shown in FIG. 2, Vectoring Group 1 uses a first set of tones 202 to transmit the RMC symbol. A second set of non-overlapping tones 204 (i.e., offset from the tones included in the first set of tones) are used to transmit the RMC symbol over Vectoring Group 2. Meanwhile, other sets of non-overlapping or disjoint tones 206 and 208 (i.e., offset and/or interleaved relative to the sets of tones used by other vectoring groups) are used to respectively transmit the RMC symbol over Vectoring Group 3 and Vectoring Group 4. As such, each vectoring group is given a unique set of tones over which the RMC symbol can be transmitted, such that interference between the vectoring groups will be reduced/eliminated.

While unique sets of tones can be used to transmit RMC symbols over the various vectoring groups, initialization symbols are transmitted over all tones, and therefore cannot utilize the interleaved tone technique discussed above with reference to the RMC symbols. Instead, initialization symbols are transmitted in a DOI, such that the initialization symbols will not interfere with the RMC symbols or other data being transmitted over other vectoring groups. In some implementations, the location in a TDD frame at which the initialization symbols are transmitted can be configurable or otherwise pre-specified, as discussed in more detail below.

Figure 3A:
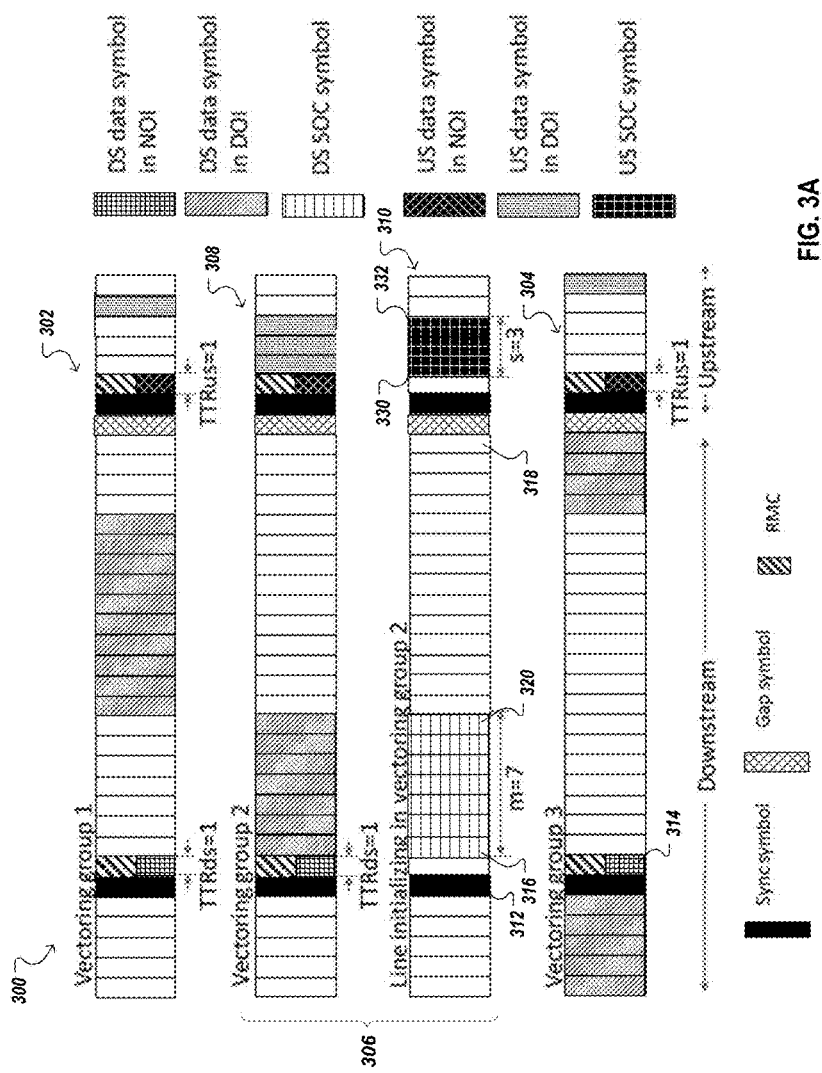
FIGS. 3A and 3B are illustrations of an example Time Division Duplex ("TDD") frames.
Figure 3B:
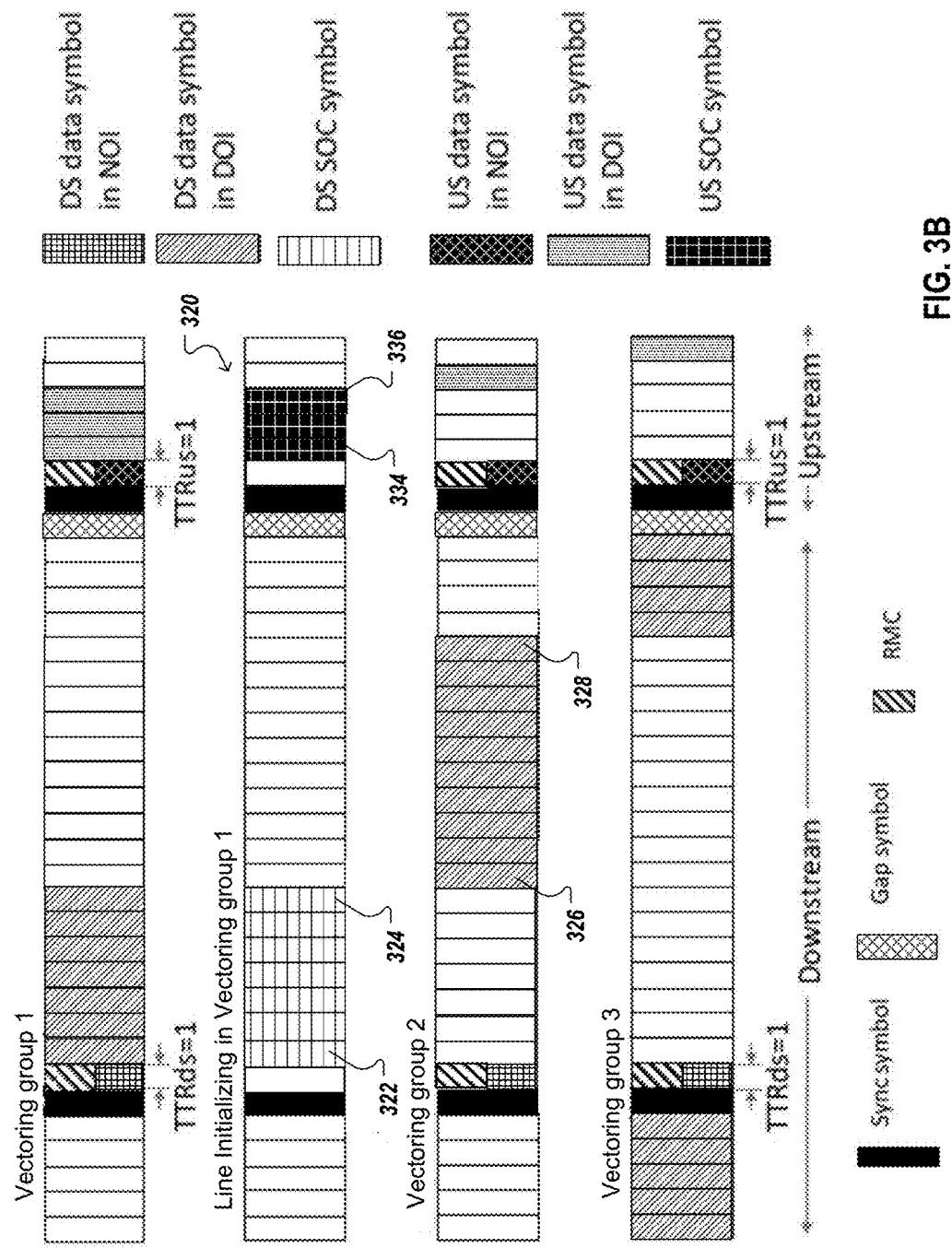

FIG. 3A is an illustration of an example TDD frame 300. In the TDD frame 300, the lines of Vectoring Group 1 302 and Vectoring Group 3 304 are in showtime, while Vectoring Group 2 306 includes one or more lines 308 that are in showtime and at least one line 310 that is being initialized. As illustrated by FIG. 3A, a downstream sync symbol is transmitted over every vectoring group at timeslot 312, and the RMC symbol is transmitted over the lines of each vectoring group that are in showtime at timeslot (also referred to as a symbol time) 314. The RMC symbols is transmitted in NOI over multiple different vectoring groups. Within the timeslot 314, additional downstream data can be transmitted in the NOI. As shown, the NOI interval for each of the downstream and upstream communications is 1 timeslot long (i.e., TTRds=1 and TTRus=1), but other NOI period lengths can be used.

As shown in FIG. 3A, the RMC symbol is not transmitted over lines that are being initialized, such as the line 310, but initialization symbols (e.g., SOC symbols) are transmitted over lines being initialized. The initialization symbols are transmitted beginning at a configurable symbol time following transmission of the RMC symbol. For example, the initialization symbols are being transmitted over 7 timeslots (e.g., period m=7 timeslots) following the timeslot 314. As illustrated by FIG. 3A, Vectoring Group 1 302, Vectoring Group 2 308, and Vectoring Group 3 are transmitting in DOI between the timeslot 316 and 318, as no two vectoring groups are simultaneously transmitting during this period. Therefore, the initialization symbols sent during this period will not interfere with transmissions over other vectoring groups. The crosstalk from the line 310 initializing into vectoring group 2 into other lines of vectoring group 2 308 can be cancelled by vectoring.

In some implementations, the initialization symbols are transmitted beginning in a first post-RMC timeslot (e.g., timeslot 316) of the TDD frame following transmission of the RMC symbol. For example, as shown in FIG. 3A, the initialization symbols are transmitted during a period from the timeslot 316 to the timeslot 320. Downstream data can also be transmitted over other lines of Vectoring Group 2 304 during the period 316 and 320 because intra-group crosstalk can be cancelled by the vectoring apparatus for lines that are within Vectoring Group 2. However, downstream data are not transmitted over lines of any other vectoring group while the initialization symbols are being transmitted over any lines of a given vectoring group. Similarly, initialization symbols can be simultaneously transmitted over multiple different lines of a same vectoring group.

When the first post-RMC timeslot is used to transmit initialization symbols, the timeslots assigned to one or more vectoring groups can be reassigned different timeslots as needed so that the initialization symbols can be sent over a line to be initialized in another vectoring group. For example, assume that after the line 310 is initialized, as shown in FIG. 3A, a line of Vectoring Group 1 302 is available for initialization. As illustrated by FIG. 3B, the period during which the initialization symbols are transmitted over a line 320 of Vectoring Group 1 begins at the timeslot 322 and extends to the timeslot 324. Additionally, data can be transmitted to other lines in Vectoring Group 1 302 during that same period. Meanwhile, Vectoring Group 2 has been assigned the period from timeslot 326 to the timeslot 328. As such, Vectoring Group 1 302 has been assigned the portion of the TDD frame previously assigned to Vectoring Group 2 306, and Vectoring Group 2 has been assigned the portion of the TDD frame previously assigned to Vectoring Group 1 302.

The examples above referred to the initialization symbols being transmitted beginning at the first post-RMC timeslot, but the location of the initialization symbols within the TDD frame can be configurable, such that various locations of the TDD frame can be used to transmit the initialization symbols. For example, the beginning of the period during which the initialization symbols are transmitted can be specified using a timeslot offset (e.g., a two symbol time delay) relative to the timeslot in which the RMC symbol is sent.

The location of the initialization symbols sent in the upstream direction can be similarly configured as discussed above with respect to the downstream initialization symbols. For example, the upstream initialization symbols (e.g., SOC symbol) can be transmitted in a first post-RMC timeslot following the sync symbol for upstream transmissions, and upstream data can be transmitted over other lines in a same vectoring group as the line being initialized. As shown by FIG. 3A, the initialization symbols for the upstream are transmitted over a period from timeslot 330 to the timeslot 332 (e.g., period s=3 timeslots). Similarly, as shown by FIG. 3B, the initialization symbols for the upstream are transmitted over a period from timeslot 334 to the timeslot 336. Upstream data will not be transmitted over other vectoring groups (e.g., vectoring group 2 and vectoring group 3) while the initialization symbols are being transmitted in a given vectoring group (e.g., vectoring group 1, but other data can be transmitted within the given vectoring group (e.g., vectoring group 1) while the initialization symbols are being transmitted in that given vectoring group, as discussed above. Upstream data from the other vectoring groups (e.g., vectoring group 2 and vectoring group 3) can be sent in the remaining upstream symbol times (e.g., the last two upstream symbol times of FIG. 3B).

FIG. 4 is a flow chart of an example process 400 for avoiding crosstalk in a vectored communications system. The process 400 can be implemented, for example, by a telecommunications device that includes a transceiver and a vectoring engine (or another vectoring apparatus). The process 400 can also be implemented in a system including multiple line pairs that are configured into multiple vectoring groups and a vectoring engine that is connected to the multiple line pairs.

A customer premises equipment ("CPE") is identified (402). In some implementations, the CPE is connected to a given line. The CPE can be identified, for example, as a CPE that has been powered up or reset, and is requesting initialization on the network. For example, the CPE can be a DSL modem or another communications device. The given vectoring group can be, for example, one of multiple different vectoring groups that are part of a same binder.

The CPE is assigned to a vectoring group (404). In some implementations, the vectoring group to which the CPE is assigned is selected based on available resources. For example, the selection can be made based on a number of lines that are already included in one or more available vectoring groups, connectivity issues (e.g., the ability of the system to pass required data to a processor of one or more vectoring groups), and/or traffic demands. Assignment of the CPE to the vectoring group also assigns the given line pair to the vectoring group.

Initialization symbols are transmitted at a configurable location of the TDD frame (406). As discussed above, the location of the initialization symbols in the TDD frame can be set to begin at a first post-RMC symbol or another specified location of the TDD frame. For example, the initialization symbols can begin to be transmitted over the given line pair at a first symbol time following transmission of an RMC symbol over other line pairs.

The transmission of the initialization symbols over the given pair can occur at a same time as the transmission of other data transmitted over other line pairs in the given vectoring group. For example, the transmission of the initialization symbols and the other data can both begin at a beginning of a DOI period (i.e., a portion of a DOI that has been assigned to the given vectoring group. In some implementations, the beginning of the transmission during the DOI period assigned to the given vectoring group can be adjusted based on whether a line of the given vectoring group is being initialized. For example, as discussed above with reference to FIGS. 3A and 3B, a vectoring group including a line that is being initialized can be assigned a portion of a DOI period that begins in the first post-RMC timeslot (i.e., a first symbol time following transmission of the RMC symbol). However, the part of the DOI period beginning in the first post-RMC timeslot may be assigned to a different vectoring group in subsequent TDD frames (e.g., when the different vectoring group includes a line to be initialized).

As noted above, when a given vectoring group has multiple line pairs to be initialized, the initialization symbols can be simultaneously transmitted to the multiple line pairs during the DOI period that has been assigned to the vectoring group. However, when multiple different vectoring groups have line pairs to be initialized, the initialization symbols will only be transmitted to one vectoring group at a time to avoid crosstalk between the vectoring groups.

In some implementations, the CPE is configured to identify the downstream RMC at a location (e.g., symbol time) of the TDD frame that immediately follows the sync symbol position. The CPE identifies the location of the RMC frame as a beginning of the logical frame, which ends at the next sync symbol position. In the upstream direction, the CPE is instructed to use a specified RMC symbol offset.

Transmission of data over other vectoring groups is prevented while the initialization symbols are being transmitted over the given vectoring group (408). In some implementations, the transmission of data over the other vectoring groups is prevented by assigning each of the vectoring groups a different non-overlapping portion of a DOI. As illustrated by FIGS. 3A and 3B, the other vectoring groups can transmit data at symbol times of a given TDD frame that do not overlap with symbol times during which the initialization symbols are being transmitted over the given vectoring group.

FIG. 5 is a block diagram of an example environment 500 in which crosstalk avoidance techniques can be implemented. The environment 500 includes a service side telecommunications device 502 that is connected to a data network 504 and multiple customer side telecommunications devices 506, 508, and 510. In some implementations, multiple line pairs connect the telecommunications device 502 to the telecommunications devices 506, 508, and 510, and these multiple line pairs can be configured into multiple vectoring groups.

Each of the telecommunications devices includes a transceiver 512a-d, and a buffer 516a-d. The transceivers 512a-d transmit and receive data within the environment 500. For example, the transceiver 512a for the service side telecommunications device 502 can transmit data to, and receive data from, each of the customer side telecommunications devices 506, 508, 510.

The service side telecommunications device 502 includes vectoring engine 514a, which can manage transmission of data (and crosstalk avoidance) over lines pairs of multiple vectoring groups. For example, the vectoring engine 514a can be configured to instruct the transceiver 512a to transmit initialization symbols at one or more configurable locations of a TDD frame as discussed above.

In a particular example, assume that the telecommunications device 506 is communicating (in showtime) over a line pair that is included in a first vectoring group and that the telecommunications device 508 is communicating (in showtime) over another line pair that is included in a second vectoring group.

In this example, when the telecommunications device 510 is powered up, it will begin an initialization process with the telecommunications device 502. In this example the telecommunications device 502 may be configured to include the line pair connected to the telecommunications device 510 in the second vectoring group, and perform the initialization process described with reference to FIGS. 3A and 4 to facilitate initialization of the telecommunications device 510 while avoiding crosstalk between the first vectoring group and the second vectoring group. In particular, the telecommunications device 502 may instruct the transceiver 512a to transmit the initialization symbols at a configurable location of the TDD frame, such as at the first post-RMC symbol. As discussed above, the RMC symbol can be transmitted in an NOI, while the initialization symbols are sent during a DOI, such that no two vectoring groups are simultaneously transmitting while the initialization symbols are being transmitted.

In some implementations, the vectoring engine 514a can include one or more vectoring control entities (e.g., one or more apparatus) that each calculates and controls intra-group crosstalk for the vectoring group controlled by that vectoring control entity and/or instructs the transceiver 512a to transmit symbols in the manner discussed above. The vectoring engine 514a can also include one or more vectoring processors that performs data processing operations to facilitate the vectoring.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The operations described in this specification can be implemented as operations performed by a data processing device on data stored on one or more computer-readable storage devices or received from other sources.

The term "apparatus" encompasses all kinds of devices and machines for processing data, including by way of example a programmable processor, a computer, a system on a chip, or multiple ones, or combinations, of the foregoing, as well as telecommunications equipment that may include one or more data processing devices. An apparatus can include special purpose logic circuitry, e.g., an FPGA (field programmable gate array) or an ASIC (application specific integrated circuit). The apparatus can also include, in addition to hardware, code that creates an execution environment a computer program, e.g., code that constitutes processor firmware, a protocol stack, a database management system, an operating system, a cross-platform runtime environment, a virtual machine, or a combination of one or more of them.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A telecommunication device, comprising:
   a transceiver; and
   a vectoring engine coupled to the transceiver, the vectoring engine including a vectoring processor and vectoring control entity, wherein the vectoring engine is configured to instruct the transceiver to initialize a given line pair of a given vectoring group after at least one line pair within the given vectoring group has already been initialized and at least one line pair within a different vectoring group has already been initialized, including instructing the transceiver to transmit, over the given line pair of the given vectoring group, initialization symbols at one or more configurable locations of a Time-Division Duplex (TDD) frame, wherein:
   the initialization symbols initialize the given line pair of the given vectoring group;
   one or more line pairs of other vectoring groups, each different from the given vectoring group, that have already been initialized are prevented from transmitting at the one or more configurable locations of the TDD frame; and
   other line pairs of the given vectoring group that have already been initialized are allowed to transmit at the one or more configurable locations of the TDD frame.

2. The telecommunications device of claim 1, wherein the vectoring engine is configured to instruct the transceiver to transmit the initialization symbols beginning at a first symbol time following transmission, over the other line pairs of the given vectoring group, of a Robust Management Channel (RMC) symbol.

3. The telecommunications device of claim 1, wherein the vectoring engine is configured to instruct the transceiver to transmit the initialization symbols at a beginning of a Discontinuous Operation Interval (DOI) for the given vectoring group that includes the given line pair.

4. The telecommunications device of claim 3, wherein the vectoring engine is configured to adjust a location of the beginning of the DOI for the given vectoring group that includes the given line pair.

5. The telecommunications device of claim 4, wherein the vectoring engine is configured to locate the beginning of the DOI at a first symbol time following transmission of a RMC symbol.

6. The telecommunications device of claim 3, wherein the vectoring engine is configured to instruct the transceiver to simultaneously transmit initialization symbols over multiple line pairs of the given vectoring group during the DOI for the given vectoring group.

7. The telecommunications device of claim 1, wherein the vectoring engine is configured to prevent transmission of data over other vectoring groups while the initialization symbols are being transmitted over the given vectoring group.

8. The telecommunications device of claim 1, wherein the vectoring engine is configured to instruct the transceiver to transmit a Robust Management Channel (RMC) symbol to multiple different vectoring groups, wherein tones used to transmit the RMC symbol to a particular vectoring group from the multiple different vectoring groups are disjoint relative to tones used to transmit the RMC symbol to other vectoring groups in the multiple different vectoring groups.

9. A method, comprising:
 identifying, by a telecommunications device, a customer premises equipment (CPE) that is connected to a given line pair of a given vectoring group; and
 initializing the given line pair of the given vectoring group after at least one line pair within the given vectoring group has already been initialized and at least one line pair within a different vectoring group has already been initialized, including transmitting, by the telecommunications device and over the given line pair of the given vectoring group, initialization symbols at a configurable location of a Time-Division Duplex (TDD) frame following transmission of a Robust Management Channel (RMC) symbol, wherein:
  the initialization symbols initialize the given line pair of the given vectoring group;
  one or more line pairs of other vectoring groups, each different from the given vectoring group, that have already been initialized are prevented from transmitting at the configurable location of the TDD frame; and
  other line pairs of the given vectoring group that have already been initialized are allowed to transmit at the configurable location of the TDD frame.

10. The method of claim 9, wherein transmitting the initialization symbols comprises transmitting the initialization symbols beginning at a first symbol time following transmission of a Robust Management Channel (RMC) symbol over the other line pairs of the given vectoring group.

11. The method of claim 9, wherein transmitting the initialization symbols comprises transmitting the initialization symbols at a beginning of a Discontinuous Operation Interval (DOI) period for the given vectoring group that includes the given line pair.

12. The method of claim 11, further comprising adjusting a location of the beginning of the DOI period for the given vectoring group that includes the given line pair.

13. The method of claim 12, further comprising locating the beginning of the DOI period at a first symbol time following transmission of the RMC symbol.

14. The method of claim 11, further comprising simultaneously transmitting initialization symbols over multiple line pairs of the given vectoring group during the DOI period for the given vectoring group.

15. The method of claim 9, further comprising preventing, by the telecommunications device, transmission of data over other vectoring groups while the initialization symbols are being transmitted over the given vectoring group.

16. A system comprising:
 multiple line pairs configured into multiple vectoring groups; and
 a vectoring engine that is connected to the multiple line pairs and controls transmission of symbols over the multiple line pairs and multiple vectoring groups, wherein the vectoring engine is configured to instruct a transceiver to initialize a given line pair of a given vectoring group after at least one line pair within the given vectoring group has already been initialized and at least one line pair within a different vectoring group has already been initialized, including instructing the transceiver to transmit, over the given line pair of the given vectoring group, initialization symbols at one or more configurable locations of a Time-Division Duplex (TDD) frame, wherein:
  the initialization symbols initialize the given line pair of the given vectoring group;
  one or more line pairs of other vectoring groups, each different from the given vectoring group, that have already been initialized are prevented from transmitting at the one or more configurable locations of the TDD frame; and
  other line pairs of the given vectoring group that have already been initialized are allowed to transmit at the one or more configurable locations of the TDD frame.

17. The system of claim 16, wherein the vectoring engine is configured to instruct the transceiver to transmit the initialization symbols beginning at a first symbol time following transmission of a Robust Management Channel (RMC) symbol over the other line pairs of the given vectoring group.

18. The system of claim 16, wherein the vectoring engine is configured to instruct transceivers to transmit a Robust Management Channel (RMC) symbol to multiple different vectoring groups, wherein tones used to transmit the RMC symbol to a particular vectoring group from the multiple different vectoring groups are disjoint relative to tones used to transmit the RMC symbol to other vectoring groups in the multiple different vectoring groups.

\* \* \* \* \*